(12) United States Patent
David et al.

(10) Patent No.: US 8,589,752 B2
(45) Date of Patent: Nov. 19, 2013

(54) METHOD OF AND TRANSMITTING DEVICE FOR TRANSMITTING A DATA BLOCK

(75) Inventors: Philip Hole David, Southampton (GB); Hartmut Wilheim, Ulm (DE)

(73) Assignee: Nokia Siemens Networks Oy, Espoo (FI)

( * ) Notice: Subject to any disclaimer, the term of this patent is extended or adjusted under 35 U.S.C. 154(b) by 510 days.

(21) Appl. No.: 12/734,451

(22) PCT Filed: Oct. 31, 2008

(86) PCT No.: PCT/EP2008/064808
§ 371 (c)(1),
(2), (4) Date: Sep. 7, 2010

(87) PCT Pub. No.: WO2009/056630
PCT Pub. Date: May 7, 2009

(65) Prior Publication Data
US 2010/0332934 A1 Dec. 30, 2010

(30) Foreign Application Priority Data
Nov. 2, 2007 (GB) .................................. 0721519.7

(51) Int. Cl.
*G08C 25/02* (2006.01)
(52) U.S. Cl.
USPC ........................................................ 714/748
(58) Field of Classification Search
None
See application file for complete search history.

(56) References Cited

U.S. PATENT DOCUMENTS

| 8,248,938 | B2 * | 8/2012 | Au et al. | 370/235 |
| 8,296,619 | B2 * | 10/2012 | Li et al. | 714/758 |
| 2004/0223507 | A1 | 11/2004 | Kuchibhotla et al. | |
| 2007/0177630 | A1 * | 8/2007 | Ranta et al. | 370/473 |
| 2010/0284338 | A1 * | 11/2010 | Persson et al. | 370/328 |
| 2011/0170488 | A1 * | 7/2011 | Chitrapu et al. | 370/328 |

FOREIGN PATENT DOCUMENTS

| EP | 0 828 392 A | 3/1998 |
| WO | WO-02/21757 A | 3/2002 |
| WO | WO-2007/109256 A | 9/2007 |

OTHER PUBLICATIONS

ETSI TS 144 060 V7.12.0, Digital celluar telecommunications system (Phase 2+); General Packet Radio Service (GPRS); Mobile Station (MS)—Base Station System (BSS) interface; Radio Link Control / Medium Access Control (RLC/MAC) protocol; (3GPP TS 44.060 version 7.12.0 Release 7); Mar. 2008.

* cited by examiner

*Primary Examiner* — Michael Maskulinski
(74) *Attorney, Agent, or Firm* — Staas & Halsey LLP

(57) ABSTRACT

A method of transmits a data block of a type from a transmitting device (for example a transmitting network node) to a receiving device (for example a receiving network node), in particular during a temporary block flow. A transmitting device is capable of receiving at least two different types of positive/negative acknowledgements for data blocks of said type from said receiving device and the reaction of the transmitting device to the positive/negative acknowledgements depends on the type of the said received positive/negative acknowledgement.

25 Claims, 4 Drawing Sheets

METHOD OF AND TRANSMITTING DEVICE FOR TRANSMITTING A DATA BLOCK

CROSS REFERENCE TO RELATED APPLICATIONS

This application is based on and hereby claims priority to PCT Application No. PCT/EP2008/064808 filed on Oct. 31, 2008 and GB Application No. 0721519.7 filed on Nov. 2, 2007, the contents of which are hereby incorporated by reference.

BACKGROUND

The invention relates to a method of transmitting a data block of a type from a transmitting device to a receiving device. Furthermore, the invention is related to a transmitting device for transmitting a data block of a type to a receiving device.

Although the physical data connections of modern networks, e.g. the cables, fiber optic cables, get better and better, errors during data transmission cannot be avoided. For this reason, numerous possibilities for error detection and error correction have been developed, e.g. the cyclic redundancy check (CRC). However, the problem of erroneous data blocks still persists.

As an example for these networks, enhanced general packet radio service (EGPRS) networks are exhibited hereinafter. However, this discussion is not limited to this kind of network and one skilled in the art will easily apply the teachings of this document to other networks. In this context, reference is made to the standard ETSI TS 144 060 V7.12.0, Digital cellular telecommunications system (Phase 2+); General Packet Radio Service (GPRS); Mobile Station (MS)-Base Station System (BSS) interface; Radio Link Control/Medium Access Control (RLC/MAC) protocol; (3GPP TS 44.060 version 7.12.0 Release 7), which is herewith incorporated by reference, particularly chapter 9.1.8.2.4, 'Interpretation of the bitmap'. In particular, also definitions, messages, message flows, and abbreviations, which are used in this application, can be found in this standard.

In this enhanced general packet radio service standard a kind of fast inband signaling has been added recently in addition to the traditional packet downlink acknowledgment (PDAN) and the packet uplink acknowledgement (PUAN). This fast inband signaling contains a short bitmap for positive and negative acknowledgements of radio link control blocks (RLC blocks) and thus speeds up the retransmission of incorrectly received RLC blocks, wherein an RLC block is an example for a data block or a data unit.

This new signaling is called 'fast acknowledged/not acknowledged reporting', FANR for short, and will, if used, substantially increase the frequency of acknowledged/negatively acknowledged reporting (ACK/NACK reporting). However, these reports are not as well protected against undetectable decoding errors as the PDAN and PUAN because their CRC is weaker.

Considering a 'transmitting endpoint', 'transmitting network node', 'transmitting device' or simply 'transmitter', i.e. one that transmits data blocks and receives acknowledgement data, and a 'receiving endpoint', 'receiving network node', 'receiving device' or simply 'receiver', i.e. one that receives data blocks and transmits acknowledgement data (which may be piggy-backed onto other data blocks), a particular risk is that a transmitting endpoint may incorrectly consider a piggy backed acknowledgement (PAN), also referred to as 'piggy-backed Ack/Nack', to be included in a data block which it decodes, because an incorrect sequence of bits, which are decoded, causes the CRC check to pass. This may happen for example when a header bit is misinterpreted as PANI (PAN Indicator) field (the PANI field indicates the presence of a PAN field and is arranged in the header of a data block). This is referred to as a 'false positive'. A 'false positive' PAN can also occur when a PAN is included, but when the bit error rate (BER) is too high for successful channel decoding and when the (decoded) CRC nevertheless is correct. Since the payload and the PAN in a radio block can address different mobile stations (MS), a high BER can be expected e.g. for an MS at the cell border if the payload transmission addresses an MS close to the base station and when the transmission uses 32-QAM (quadrature amplitude modulation). The combination of more frequent reporting and weaker protection will lead to more undetected errors which, in many cases, will cause an abnormal temporary block flow release (TBF release). A particular problem is that this release can rely on existing timers which are set to several seconds (e.g. 5 seconds).

Although the CRC size inside the PAN can be increased, e.g. from 6 to 10, to reduce the probability of a 'false positive' acknowledgement, the probability never will be zero. In some cases, the CRC is XOR-ed with the temporary flow identity (TFI) for the destination MS. If a different MS, which is multiplexed on the same resources, tries to decode the PAN applying an XOR (Exclusive or Operation) with its (different) TFI, the CRC properties can be weakened. Thus, several error events may occur per hour in a multislot EGPRS transmission.

The result of the reception of a 'false positive' may be:
1. That an RLC transmitting endpoint incorrectly believes a block has been acknowledged negatively
2. That an RLC transmitting endpoint incorrectly believes a block has been acknowledged positively Case 1 causes unnecessary retransmissions.
Case 2 could cause the transmit window to advance further than the receive window. In this case:
  a) the transmitting endpoint will transmit blocks with higher SSNs (starting sequence numbers) than the peer (receiving endpoint) expects, and
  b) the transmitting endpoint will not re-transmit blocks which the peer (receiving endpoint) expects.

Case b) could eventually end in a TBF deadlock, if one device, i.e. the receiving device, expects retransmissions, but the other device, i.e. the transmitting device, has discarded the block(s) from its memory, in particular its transmit buffer.

One option is to further increase the CRC length which would reduce the occurrence rate of such errors. However, this would also reduce the number of bits available for payload. It is therefore proposed to take measures on protocol side to minimize the impact of such error events.

The problem of stalled windows (where a transmitting device is hindered from transmitting further blocks, due to waiting for an acknowledgement of earlier transmitted blocks) is already known. The solution is to simply wait for an acknowledgement, which may indicate negative acknowledgements for some data blocks (in which case these are then retransmitted) and/or positive acknowledgements for other data blocks (which may allow the transmitting entity to discard some buffered blocks and possibly advance the transmit window, allowing new blocks to be transmitted for the first time). A drawback of this method is that the transmission of some data blocks is delayed.

However, the inventors' proposal addresses a new problem caused by the relatively high probability that an acknowledgement indication may suffer from a 'false positive' detection. This increased 'false positive' probability arises from, for example, the specific nature of the fast ACK/NACK reporting scheme used in EGPRS networks, whereby a very small ACK/NACK field is piggy-backed on existing data blocks, and the ACK/NACK field is coded independently of the rest of the block.

SUMMARY

Accordingly, one possible object is to provide an improved method of and an improved transmitting device for data transmission in a network.

Accordingly, a method of transmitting a data block of a type from a transmitting device (for example a transmitting network node) to a receiving device (for example a receiving network node) is disclosed, wherein the transmitting device is capable of receiving at least two different types of positive/negative acknowledgements for the data block of the type from the receiving device and wherein the reaction to the positive/negative acknowledgements after reception/decoding of the transmitting device depends on the type of the received positive/negative acknowledgement.

Accordingly, also a transmitting device for transmitting a data block of a type to a receiving device, in particular network node, is disclosed, the transmitting device being designed for receiving at least two different types of positive/negative acknowledgements for the data block of the type from the receiving device and for reacting to the positive/negative acknowledgements after the reception/decoding of the same depending on the type of the received positive/negative acknowledgement.

The inventors' proposal offers the advantage that the transmitting device is able to receive acknowledgements, which may be positive or negative acknowledgements, of at least two different types, each having different characteristics and thus having different tendencies for errors. For example a positive acknowledgement may be corrupted on the transmission path to the transmitting device so that a negative (and thus wrong) acknowledgement is received there. However, also a negative acknowledgement may be corrupted on the transmission path to the transmitting device so that a positive (and thus wrong) acknowledgement is received there. An acknowledgment which, after decoding, contains errors which cannot be detected is also referred to as a 'false positive'. Knowledge of the relative probability of 'false positives' associated with different types of acknowledgements is used to determine how to treat different types of acknowledgements, in particular when positive/negative acknowledgements of different types indicate conflicting acknowledgement status of the same transmitted data block. This gives advantage over related art systems as a kind of redundancy is used to find out if a, for example, positive acknowledgement is plausible.

It should be noted at this point, that the acknowledgements may be part of one single protocol. It should also be noted that the at least two different types of positive/negative acknowledgements may refer to data blocks of the same type, the type being for example data blocks of one of the protocol layers.

Finally, it should be noted that the method and device are not limited to just two types of acknowledgments but also apply to three or more types.

It is advantageous if the transmitting device receives and processes at least two different types of positive/negative acknowledgement information, wherein each type of positive/negative acknowledgement information comprises one or more positive acknowledgements and/or negative acknowledgements of a single type relating to individual data blocks of the type. Accordingly, a plurality of acknowledgements of a first type can be transmitted in positive/negative acknowledgement information of a first type, and one or more acknowledgements of a second type can be transmitted in positive/negative acknowledgement information of a second type. The method and device are not limited to acknowledgements of single data blocks but also apply to a set of acknowledgements for several data blocks of the same type. This method of acknowledging is efficient to acknowledge a lot of data blocks in one go.

In this context, it is also advantageous if the type of positive acknowledgement and/or negative acknowledgement is characterized by the type of the positive/negative acknowledgement information in which it is included.

One should note that the method and device are based on the earlier application GB0721519.7 and in this earlier application the general term 'acknowledgement' variously has been used for 'acknowledgement' as well as for 'acknowledgement information'. However, as the meaning is unambiguously clear considering the context the term is used, one skilled in the art will easily substitute 'acknowledgement' for 'acknowledgement' or 'acknowledgement information' as the case may be.

Furthermore it is advantageous if the second type of positive/negative acknowledgement is more reliable than the first type. If both types are equally error-prone, then a contradiction of the two types indicates that something is wrong whereas in this advantageous embodiment, the more reliable acknowledgement also indicates what is more likely to be right or wrong.

In this context it is advantageous, if the second type of acknowledgement is coded such that reception and/or correct decoding and/or correct detection of decoding errors of this type is more reliable than that of the first type of acknowledgement.

In another advantageous embodiment, for the second type of positive/negative acknowledgement information it is less probable than for the first type that a consistency check applied to the positive/negative acknowledgement information passes even though the decoded positive/negative acknowledgement information is incorrect. This is an advantageous example of how reliability of the acknowledgements can be specified. Consistency checks are commonly used which is why the method and device can be implemented with low technical effort.

In yet another preferred embodiment, the consistency check is a cyclic redundancy check. This is a further specification of what a consistency check can be. Again, implementing the change can take place with low technical effort.

It is advantageous if a positive acknowledgement contained within an acknowledgement field (containing a plurality of positive and/or negative acknowledgements) is ignored if a positive or negative acknowledgement contained therein is classified as unreliable. In an advantageous embodiment, all positive acknowledgements contained within an acknowledgement field are ignored if a positive or negative acknowledgement contained therein is classified as unreliable.

It is beneficial if the transmitting device ignores all positive acknowledgements contained within positive/negative acknowledgement information of the first type which has been classified as unreliable. This offers the advantage that it ensures that the data blocks associated with the unreliable positive acknowledgements are not discarded by the transmitting device and may be retransmitted if subsequent positive/negative acknowledgement information or a positive/negative acknowledgement indicates that the data blocks were not received correctly by the receiving device.

In a beneficial embodiment, an acknowledgement information or acknowledgement field (containing a plurality of positive and/or negative acknowledgements) is ignored if a positive or negative acknowledgement contained therein is classified as unreliable.

In another embodiment, the transmitting device ignores all information contained within positive/negative acknowledgement information of the first type which positive/negative acknowledgement information has been classified as unreliable. Here, not only any positive acknowledgement but also any negative acknowledgement within the unreliable unit of positive/negative acknowledgement information is ignored.

It is advantageous if the transmitting device signals to the receiving device that it has classified positive/negative acknowledgement information of the first type as unreliable. It may be useful to inform the receiving device so that also the receiving device can take necessary steps to avoid a problem.

In a further advantageous embodiment, the transmitting device requests the receiving device to transmit positive/negative acknowledgement information of the second type if it has classified previously received positive/negative acknowledgement information of the first type as unreliable. In this case, the check, whether an acknowledgement of the first type is wrong may be done 'on demand'. As one can imagine, second type acknowledgement information requires additional transmission bandwidth. Thus, it can be useful to check whether everything is right by sending second type acknowledgement information only from time to time or when positive/negative acknowledgement information of the first type is classified as unreliable.

In yet another advantageous embodiment, in particular during a temporary block flow (TBF), the transmitting device stores the data block to be sent in a memory and the data block is kept stored in the memory if an acknowledgment of a first type, in particular a piggy backed acknowledgment (PAN), is received from the receiving device indicating that the data block has been received correctly and the data block is removed from the memory if an acknowledgment of a second type, in particular a packet downlink acknowledgment (PDAN) or a packet uplink acknowledgement (PUAN), is received from the receiving device indicating that the data block has been received correctly. This embodiment offers the advantage that the transmitting device is able to retransmit data blocks, which have been positively acknowledged by an acknowledgement of the first type, if subsequently it turns out that the positive acknowledgement is unreliable, i.e. if the acknowledgement is 'false positive'. According to the related art, the connection would have to be closed, as the states at both devices are out of synchronization and could not be re-synchronized. The proposed method addresses this problem. The longer the blocks remain stored, the lower is the risk that a retransmission is not possible. As the buffering capacity of a device must be provided for transmitting anyway, no expensive additional equipment is required. For example, the transmitting nodes in an EGPRS network have to have a buffer for the entire window size (although in some cases fewer than window size blocks are 'outstanding', i.e. have been transmitted but have not yet been positively acknowledged).

In an advantageous embodiment, the data block is resent if a positive acknowledgement is classified as unreliable. It can happen that a positive acknowledgement of a data block which has been decoded by the transmitting device is wrong in reality. In other words, the receiving device did not transmit such a positive acknowledgement, but due to channel conditions and/or decoding errors and/or limitations of a consistency check, the transmitting device believes that the receiving device transmitted such an acknowledgement. This case is an example for a 'false positive' acknowledgement. However, by the proposed method such a false positive acknowledgement can be detected, and subsequently the data block is sent once more.

In a further beneficial embodiment, the removal of the data blocks from the memory is independent from receiving an acknowledgment of a first type and occurs on receiving an acknowledgement of a second type.

It is advantageous if the positive/negative acknowledgement information of the first type is classified as unreliable if it contains a positive acknowledgement for the data block and previously received positive/negative acknowledgement information contained a negative acknowledgement for the data block. Furthermore, it is advantageous if the positive/negative acknowledgement information of the first type is classified as unreliable if it contains a negative acknowledgement for the data block and previously received positive/negative acknowledgement information contained a positive acknowledgement for the data block. Here, a false acknowledgement is detected by the contradiction of a first positive acknowledgement and a second negative acknowledgment or vice versa. In this context it is advantageous if the acknowledgement of the first type is contained within a piggy backed acknowledgement (PAN) and the acknowledgement of the second type is contained within a packet downlink acknowledgment (PDAN) or a packet uplink acknowledgement (PUAN) for a data block. PAN, PDAN and PUAN are or will be used in EGPRS networks anyway and can provide an additional function now.

Furthermore, it is advantageous if the positive/negative acknowledgement information of the second type is transmitted within a packet downlink ACK/NACK message, packet downlink ACK/NACK Type 2 message or packet uplink ACK/NACK message.

Furthermore, it is advantageous if the positive/negative acknowledgement information is transmitted within a piggy-backed ACK/NACK field.

It is advantageous if the acknowledgement of the first type is contained within a piggy backed acknowledgement (PAN) and the acknowledgement of the second type is contained within a packet downlink acknowledgment (PDAN) or a packet uplink acknowledgement (PUAN). Accordingly, a positive acknowledgement contained within a PAN does not lead to a removal whereas a positive acknowledgement contained within a PDAN/PUAN does lead to a removal of a stored data block.

In yet another advantageous embodiment, the transmitting device classifies positive/negative acknowledgement information of a first type as unreliable if it contains a positive acknowledgement for a data block which has not been transmitted by the transmitting device. This is a very clear indication of a transmission error and thus suitable for the proposed method. A further advantage is that no extra information has to be exchanged between the devices to detect a false positive acknowledgement.

Furthermore, it is advantageous if the connection, in particular the temporary block flow, is closed, if the transmitting device receives an indication from the receiving device that a data block has not been received correctly and if the data block has been removed from the memory of the transmitting device. It may happen, that a data block is not stored in the transmit buffer of the transmitting device when an incorrect reception of the data block is detected. For example, the data block has been overwritten by a newer data block. In such a case, the connection is closed and restarted.

It is also advantageous, if the positive acknowledgement is classified as unreliable if the receiving device receives a data block with a sequence number greater than the highest sequence number in a receive window. This is a further clear indication of a transmission error and thus a suitable indicator as well. Again, no extra information has to be exchanged between the devices to detect a 'false positive' acknowledgement.

Finally, it is advantageous if the transmitting device uses the Radio Link Control/Medium Access Control protocol for Enhanced General Packet Radio Service with the Fast Acknowledgement/Negative Acknowledgement Reporting feature also known as Reduced Latency. The protocol already offers messages which can be used for the proposed method which is why an implementation of the same can take place with low technical effort.

It should be noted at this point that the embodiments and advantages presented for the method mutatis mutandis apply to the device.

It should also be noted that embodiments disclosed herein can be combined in any desired way.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
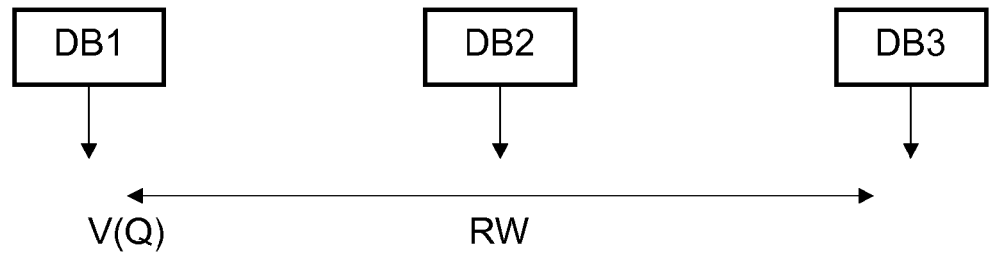
FIG. 1 shows possible cases when a data block is received which is or is not expected.

Reference will now be made in detail to the preferred embodiments of the present invention, examples of which are illustrated in the accompanying drawings, wherein like reference numerals refer to like elements throughout.

The transmitting device is referred to as transmitting network node and the receiving device is referred to as receiving network device hereinafter.

The method and device have a plurality of different aspects:

1. Storage of blocks that have been acknowledged:
A transmitting device stores blocks even after they have been acknowledged, in particular if that acknowledgement was by a PAN.

2. PUAN/PDAN sent in response to unexpected block:
A data block which is received but was not expected because if falls in front of the receive window is indicative of a 'false positive' and this triggers (directly or indirectly) a PUAN/PDAN to be sent.

3. A PAN covering unexpected block is treated 'cautiously':
A PAN which refers to blocks in a manner which is not expected is treated in a fail-safe manner, so that the transmit window is not advanced, and the probability that necessary retransmissions can be made is increased.

4. Fast closure/reset of out-of-sync TBFs:
Rather than relying on existing timers to detect a TBF deadlock, a signal is transmitted to the peer entity as soon as practical after realizing that the receiving device waits for a retransmission of a block which the transmitting device no longer has buffered.

5. Reception of inconsistent PDAN/PUAN—process with priority over existing state:
Since in most cases a PDAN/PUAN is transmitted more robustly than a PAN, PDAN/PUAN information should take precedence over previous state. This may require the transmit window to move 'backwards'.

Case 1) Storage of blocks that have been acknowledged:
One requirement to avoid deadlocks is that RLC transmitting endpoints maintain data blocks in the transmit buffer, even after they have been acknowledged by a PAN (no such requirement would exist for blocks acknowledged by a PDAN/PUAN due to the very much lower probability of a 'false positive' PDAN/PUAN). The capability of maintaining data blocks in the transmit buffer needs not to be signaled to the peer entity.

Furthermore, maintaining data blocks in the transmit buffer normally does not cause extra effort since buffering capacity must be provided for the entire window size WS anyway (however, in some cases fewer than window size blocks are 'outstanding', i.e. have been transmitted but have not yet been positively acknowledged). The storing of data blocks enables the transmitting device to retransmit blocks, which have been acknowledged positively, if subsequently it turns out that the acknowledgement is false, that is to say was contained within a 'false positive' PAN. Without this storage, the TBF would have to be closed (see case 4), since the states at the network nodes are mismatched and cannot be resynchronized (without restarting the TBF). The longer the blocks are stored, the lower is the risk that a retransmission is not possible.

Case 2) PUAN/PDAN sent in response to unexpected block:
In RLC acknowledged mode, the receive window is defined as the range of WS (window size) consecutive sequence numbers starting with the sequence number corresponding to the oldest block which has not yet been received. The receipt of a block with a sequence number greater than the highest sequence number in the receive window indicates that the transmit window of the peer (transmitting) device has advanced further than the receive window of the receiving device. This indicates that the transmitting device has incorrectly advanced its window, based on a 'false positive' PAN. This situation is depicted in FIG. 1, which shows a first, a second and a third data block DB1 ... DB3, a receive window state variable V(Q) and a receive window RW. The sequence numbers of the data blocks DB1 ... DB3 increase from left to right in the FIG. 1, and the third data block DB3 has a sequence number higher than the highest sequence number in the receive window. V(Q) is the oldest block (i.e. block with lowest sequence number) which has not been correctly received by the receiving device. This is applicable to RLC acknowledged mode. However, the definition for non-persistent mode is similar, but more complex.

In response to this, an endpoint (network node) which receives an RLC block DB3, which is ahead of the receive window RW, sends an according message to the peer entity. For example, it sends a PUAN/PDAN at the first opportunity, which includes the beginning of the window (BOW).

Alternatively (and particularly applicable if the receiving device of the data blocks is the mobile station, which currently transmits PDANs only in response to a poll from the network), the endpoint informs the peer entity about the reception of an unexpected data block. The 'packet mobile TBF status', containing an appropriate cause, e.g. 'Receive and transmit windows not synchronized', may be used for this cause. The peer entity (i.e. the network) then polls for a PDAN and indicates (to the mobile station) that the PDAN should contain the beginning of the receive window.

If the indication to the peer entity is in the form of a PUAN/PDAN, such a message must be treated with higher priority than previous PANs. If, for example, the PUAN/PDAN indicates a NACK, this takes priority over any previous ACK.

In RLC non-persistent mode, the receive window is defined differently so that no particular block is ever considered 'unexpected' by a receiving device. The approach specified here would therefore not apply to RLC non-persistent mode. RLC endpoints may retransmit blocks that have been previously correctly received, e.g. if an acknowledgement has not yet been received when the block is retransmitted. Therefore only the data block DB3 on the right end of FIG. 1 is considered erroneous.

The benefit of this embodiment is that the other endpoint can find out if the windows are out of synchronization.

Figure 2:
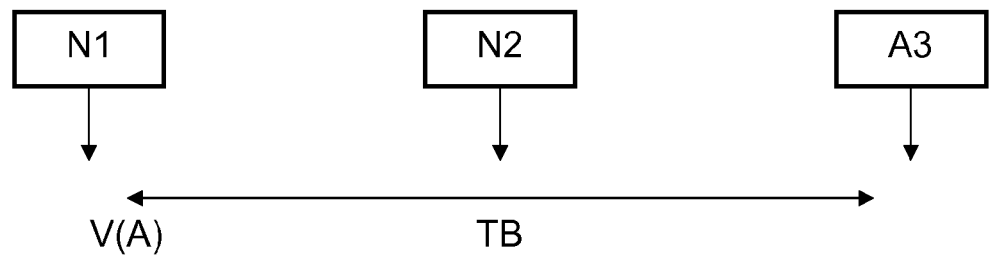
FIG. 2 shows possible cases when a PAN is received.

Case 3) PAN covering unexpected block is treated 'cautiously':

The treatment of a PAN, which refers to previously transmitted blocks by their sequence number, (rather than, for example, by the time at which they were transmitted) is proposed to be modified as follows. A PAN which refers to a block which is outside of the transmit window (i.e. a block with sequence number lower than the lowest sequence number in the window, or higher than the highest sequence number which has been transmitted, but taking into account—i.e. ignoring—'padding' bits which cannot be distinguished from NACKs for blocks which the RLC receiving device has not yet received) indicates either that that PAN or a previously-received PAN is not a genuine PAN, but is a 'false positive' reception. A NACK for a lower sequence number than the lowest sequence number in the window is a special case of the more general condition that, if a previously positively acknowledged block is subsequently negatively acknowledged, something is wrong. Furthermore, even if an ACK refers to a block sequence number (BSN) inside the window, a fail safe mode should also be chosen if this BSN has not been transmitted yet. These cases are illustrated in FIG. 2, which shows a first and a second negative acknowledgement N1 and N2, a positive acknowledgement A3, an acknowledge state variable V(A) and a range of blocks which have been transmitted TB. The first negative acknowledgement N1 is related to a first data block DB1, for which previously a positive acknowledgement has been received, and the second negative acknowledgement N2 is related to the second data block DB2, for which previously a positive acknowledgement has been received. It should be noted that the negative acknowledgements N1 and N2 are contained in a PAN in this example, as a PUAN with an inconsistent negative acknowledgement is not considered to be an error. Finally, it should be noted that V(A) is the oldest block (i.e. block with lowest sequence number) which has not been positively acknowledged by the receiving device and which still may be retransmitted.

A plausibility check can be applied in a very similar way to a time-based PAN. Violation of the following requirements should lead to a cautious treatment.

An RLC block which has previously been acknowledged should not be negatively acknowledged.

RLC blocks should not be acknowledged for transmission times at which no block has been sent (a very evident violation being an ACK for a transmission time in the future). It is expected that almost all 'false positives' will fail the plausibility check.

Two treatments are possible. In both cases, the intention is to prevent the advance of the transmit window as a result of the reception of this PAN:
1. The PAN is completely ignored.
2. Only NACKs within the PAN are treated, i.e. no blocks shall be considered as positively acknowledged based only on the contents of this PAN.

The advantages of such a method are:
if the most recently received PAN is a 'false positive', then no positive acknowledgements are inferred, and so blocks which have not otherwise been acknowledged will remain stored in the transmitting device's buffer for retransmission.
if it was a previous PAN which was the 'false positive', this approach minimizes the risk that earlier blocks will be removed from the transmitting device's buffer and maximizes the possibility that the necessary retransmissions will be possible.

A further enhancement (which is not necessarily linked to the previous paragraph) is that the situation is signaled to the peer entity, to trigger a complete PDAN/PUAN which should start at the beginning of the window, to avoid confusion in the transmitting device. In the case where the PAN is received by the mobile station, this may be by a 'packet mobile TBF status' message, with an appropriate (new) cause indication (e.g. 'PAN not consistent with transmit window'). In the case where the PAN is received by the network, this may be by a poll for a complete PDAN including the 'first partial bitmap' (i.e. mandating that the mobile station explicitly indicates what is the beginning of the receive window). As a result, a questionable PAN will be dealt with in a fail safe way (ACKs are ignored), and the transmission of a highly reliable ACK/NACK message is triggered in many cases.

PUANs/PDANs may cover blocks below the transmit window if a PAN was received shortly before the PUAN/PDAN. (A PDAN refers to blocks received up to the time when the poll was received; an event-based PAN may cover later blocks than this, but maybe received first. Similarly for 'time-based' FANR, a time-based PAN may be generated in the network after a PUAN but may arrive first). Therefore no inference of a 'false positive' should occur regarding a PDAN/PUAN which appears to refer to blocks 'below' the transmit window.

Case 4) Fast closure/reset of out-of-sync TBFs:

If a transmitting device determines that it cannot synchronize with the receiving device (e.g. it has received a PUAN which indicates a NACK for a block which is no longer stored), the TBF is closed (or possibly reset, so that no resource re-assignment is carried out) are provided.

Existing messages can be used where possible (e.g. 'packet TBF release', where the release is initiated by the network). A specific cause value can be used to identify the reasoning for the release. A further enhancement is to indicate that, although the RLC state is to be reset, the resources assigned (at the medium access control layer) are to be retained unchanged. So, the transmission does not have to wait for a timeout. Data transfer may be able to continue without the need for resource reassignment.

Figure 3:
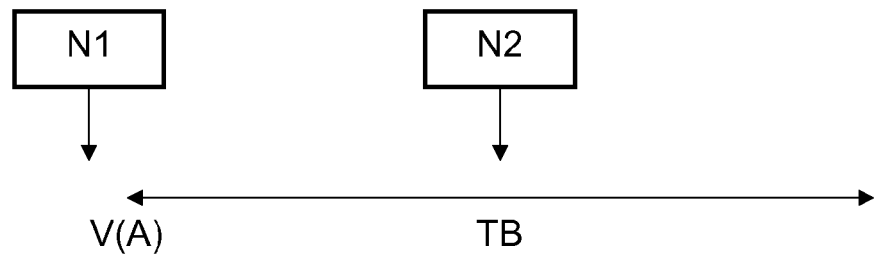
FIG. 3 shows possible cases when a PDAN/PUAN is received.

Case 5) Reception of inconsistent PDAN/PUAN:

If an RLC endpoint receives an ACK/NACK bitmap in a PDAN/PUAN which is inconsistent with previously received information (i.e. it negatively acknowledges a block which was previously considered positively acknowledged) then this can also be an indication of a previously received 'false positive' PAN. These cases are depicted in FIG. 3, which is identical to FIG. 2 but without the positive acknowledgement A3 and wherein the negative acknowledgements N1 and N2 are not contained in a PAN message but in a PUAN/PDAN message.

In this case the endpoint considers the PDAN/PUAN as correct and updates V(B), V(A) and V(S) accordingly. This may result in a block needing to be retransmitted which was previously considered acknowledged. There are two possibilities:

the RLC transmitting device still has the block buffered (for example because the procedure described for case 1 above has been followed); normal procedures resume. In case the procedure described in case 1) is not followed, the transmitting device should take care not to delete blocks in its buffer which need to be transmitted even though they were formerly outside of the transmit window (in effect, the transmit window has moved backwards)

the RLC transmitting device no longer has the block buffered; in this case it signals to its peer that the TBF should be released (see case 4 above)

It is possible that a PAN (especially a time-based PAN) correctly resulted in a block being considered acknowledged and was received before a PUAN/PDAN which was constructed at a time when the block had not been received at the base station system (BSS). However, this case is protected by the current requirements whereby no information is derived from a PUAN/PDAN regarding blocks which were (re-)transmitted recently such that the PDAN/PUAN could not possibly take those transmissions into account.

For NPM (Non-Persistent Mode), the TBF needs not to be closed as a result of this situation. The probability of a 'false positive' PDAN/PUAN is negligible due to the higher CRC protection and robust modulation; therefore the possibility that a PDAN/PUAN appears to acknowledge a block which has not yet been transmitted is low.

Figure 4:
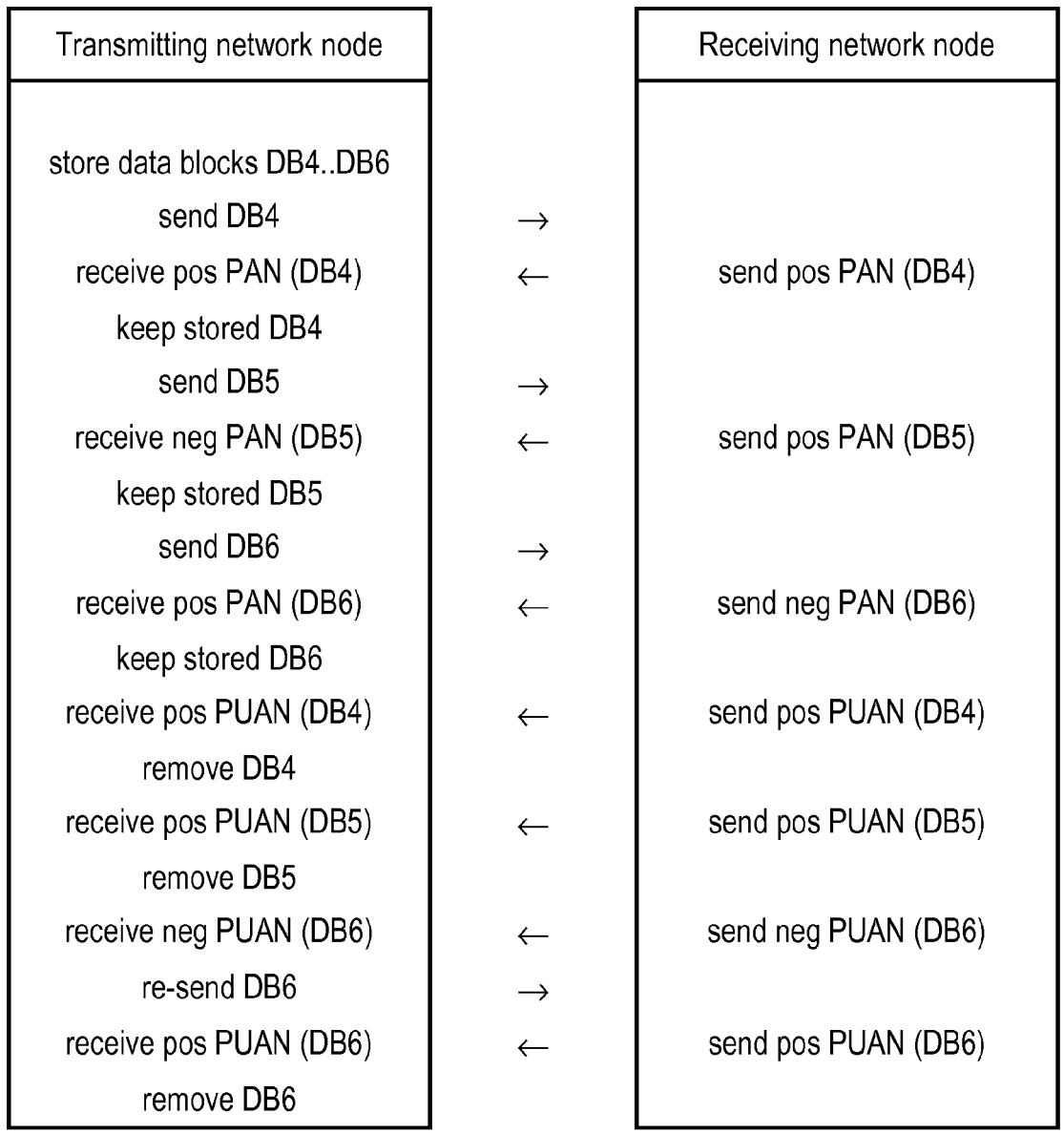
FIG. 4 shows a first typical message flow, in which acknowledgement information contains only one acknowledgement.

FIG. 4 now shows a message flow between a transmitting network node and a receiving network node illustrating the above described operations. First of all, data blocks DB4 . . . DB6 are stored in the transmitting network node. In a second step, the first data block DB4 is transmitted to the receiving network node, which positively acknowledges the reception with a PAN. The transmitting network node receives this PAN but, however, keeps stored the data block DB4. The same procedure happens for DB5 and DB6, except that a negative PAN is received for data block DB5 and a positive PAN is received for data block DB6 by the transmitting network node (e.g. because the PAN(DB5) and PAN(DB6) are corrupted on the transmission path). Note that in the example depicted in FIG. 4 DB5 is not resent although a negative acknowledgement has been received. However, in a further embodiment (not shown), the transmitting network node resends DB5 as a consequence of the negative acknowledgement.

Then, a positive PUAN is sent for the data block DB4. There is no contradiction between the positive PAN and the positive PUAN for DB4. Accordingly, the data block DB4 is removed from the memory. In a next step, a positive PUAN is sent for the data block DB5. There is a contradiction between the negative PAN and the positive PUAN. However, the PUAN is considered as being more reliable and thus gets priority over the PAN. Accordingly, the second data block DB5 is removed as well. Finally, a negative PUAN is sent for the data block DB6. Again there is a contradiction, now between a positive PAN and a negative PUAN and again the PUAN gets priority over the PAN. Accordingly, the data block DB6 is re-sent. Finally, the reception is positively acknowledged by a positive PUAN for the data block DB6. Hence, the data block DB6 is removed from the transmitting network node's memory accordingly.

Figure 5:
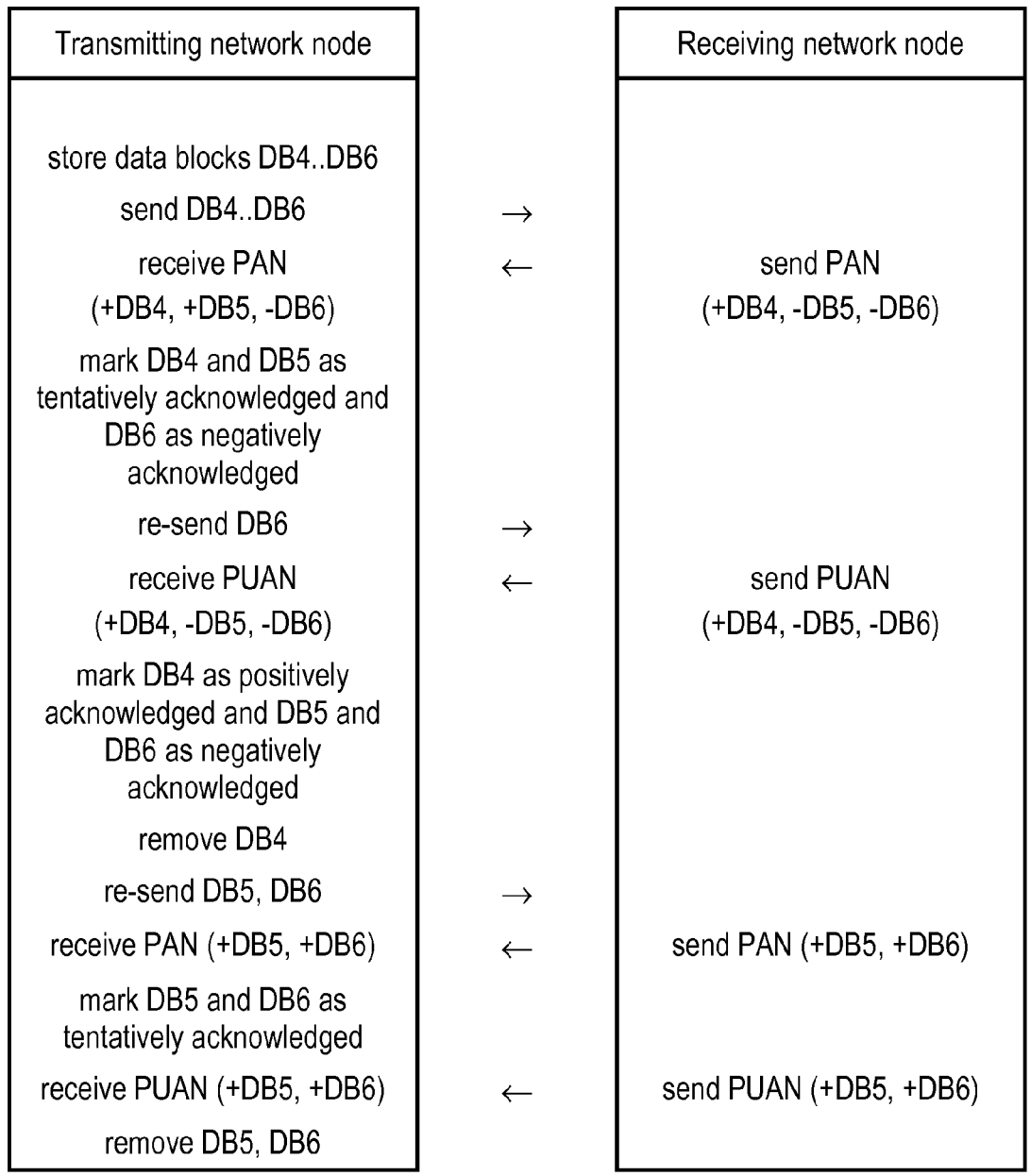
FIG. 5 shows a second message flow, in which acknowledgement information contains a plurality of acknowledgements.

FIG. 5 shows another example for a communication between a transmitting network node and a receiving network node. First of all, the data blocks DB4 . . . DB6 are stored in the transmitting network node. Then, the data blocks DB4 . . . DB6 are sent to the receiving network node. The receiving network node sends one single PAN for all data blocks DB4 . . . DB6 in this example. To indicate a positive acknowledgement a plus sign is put in front of a data block, to indicate a negative acknowledgement a minus sign is put in front of a data block in the drawing. From the transmitting network node's perspective, the data blocks DB4 and DB5 are (tentatively) positively acknowledged (DB5 based on a wrongly received PAN however), the data block DB6 negatively. Thus, data block DB6 is re-sent. In a further step, a PUAN is sent for the data blocks DB4 . . . DB6. The data block DB4 is positively acknowledged, the data blocks DB5 and DB6 negatively. One can see that there is a contradiction for the second data block DB5. Accordingly, the positive PAN for data block DB5 is ignored or the tentative positive acknowledgment is taken back and set to a negative acknowledgment respectively. For data block DB4 there is no contradiction. So, data block DB4 is removed from the transmit buffer of the transmitting network node. For data block DB6 there is no contradiction, but it has been negatively acknowledged twice. Accordingly, the data blocks DB5 and DB6 are re-sent. Subsequently, a PAN and then a PUAN is sent, both positively acknowledging the data blocks DB5 and DB6. Thus, the data blocks DB5 and DB6 are removed from the transmit buffer finally. Again it should be noted that the transmitting node does not necessarily receive the same acknowledgment, which the receiving network sends, as it is the case for data block DB5 in this example.

Figure 6:
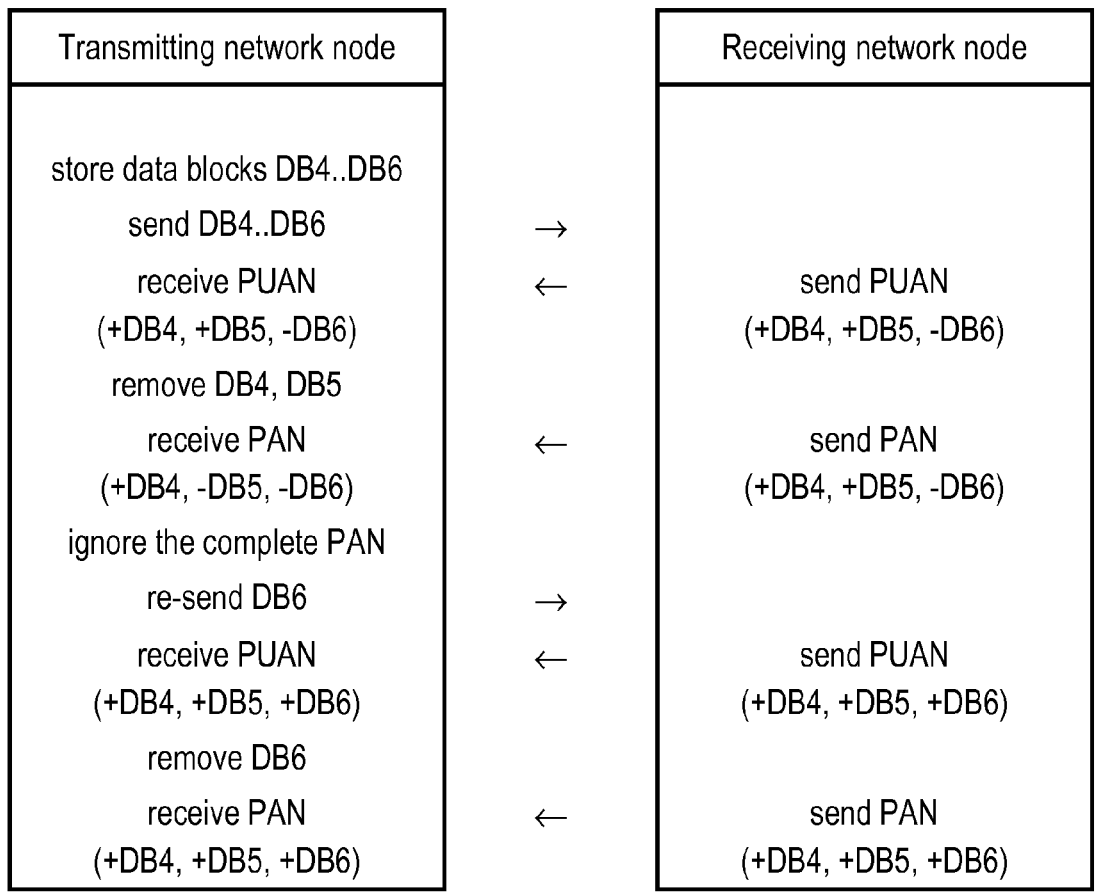
FIG. 6 shows a third message flow, in which acknowledgement information contains a plurality of acknowledgements.

FIG. 6 shows an example which is quite similar to that shown in FIG. 5, however, a PUAN is sent before a PAN in this example. If a contradiction between acknowledgments occurs (specifically related to data block DB5 again), the complete PAN is ignored. In this example data blocks DB4 and DB5 are positively acknowledged which is why they are removed from the memory. For data block DB6 a negative acknowledgement is received. Accordingly, data block DB6 is resent.

In addition, a positive acknowledgement is classified as wrong, if it refers to a block DB4 . . . DB6 which is outside of a transmit window in FIGS. 4-6.

One should note, in particular with respect to FIGS. 4 to 6, that the acknowledgement (e.g. PAN, PDAN, PUAN) received by the transmitting device is not necessarily the same which has been sent by the receiving device. The acknowledgement can be corrupted on the transmission path or misinterpreted or wrongly decoded by the transmitting device. Hence, it is important what is received not what has been sent. Furthermore, the examples in FIGS. 4 to 6 are based on a PUAN as second type of positive/negative acknowledgement or second type of positive/negative acknowledgement information. If the data blocks are transmitted in the opposite direction, i.e. an EGPRS network is the transmitting network node and a mobile station is the receiving network node, a PDAN will be used instead of a PUAN.

The method and device are applicable to all kind of networks and in particular for use in GSM BSC (Base Station Controller) or GSM BSS, radio link control for GPRS/EGPRS and in devices implementing the Fast ACK/NACK Reporting (FANR) feature (a.k.a. Reduced Latency).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004). The singular reference of an element does not exclude the plural reference of such elements and vice-versa. In a device claim enumerating several units, several of these units may be embodied by one and the same item of software or hardware. The mere fact that certain measures are recited in mutually different dependent claims does not indicate that a combination of these measures cannot be used to advantage.

The invention claimed is:

1. A method of transmitting a data block from a transmitting device to a receiving device, comprising:
   receiving at least two different types of positive/negative acknowledgements at the transmitting device for the data block, the acknowledgements being a packet ACK/NACK and a piggy-backed ACK/NACK, the acknowledgements being sent from the receiving device;
   decoding the positive/negative acknowledgements at the transmitting device;
   for each of the positive/negative acknowledgements, identifying the type of acknowledgement; and
   reacting to each of the positive/negative acknowledgements with a reaction that depends on the type of positive/negative acknowledgement.

2. The method according to claim 1, wherein
   the transmitting device receives and processes at least two different types of positive/negative acknowledgement information units, and
   each type of positive/negative acknowledgement information unit includes a plurality of acknowledgements of a single type relating to a plurality of individual data blocks of said type.

3. The method according to claim 2, wherein the type of positive/negative acknowledgements corresponds with the type of the positive/negative acknowledgement information unit in which it is included.

4. The method according to claim 2, wherein
   the transmitting device classifies a first type of positive/negative acknowledgement information units as unreliable, and
   the transmitting device ignores all positive acknowledgements contained within the first type of positive/negative acknowledgement information units.

5. The method according to claim 2, wherein
   the transmitting device classifies a first type of positive/negative acknowledgement information units as unreliable, and
   the transmitting device ignores all acknowledgements contained within the first type of positive/negative acknowledgement information units.

6. The method according to claim 2, wherein
   the transmitting device classifies a first type of positive/negative acknowledgement information units as unreliable, and
   the transmitting device signals to the receiving device that it has classified the first type of positive/negative acknowledgement information units as unreliable.

7. The method according to claim 2, wherein
   a first type of positive/negative acknowledgement information units is less reliable than a second type of positive/negative acknowledgement information units, and
   if the transmitting device classifies the first type of positive/negative acknowledgement information units as unreliable, the transmitting device requests the receiving device to transmit the second type of positive/negative acknowledgement information units.

8. The method according to claim 2, wherein
   a first type of positive/negative acknowledgement information units is less reliable than a second type of positive/negative acknowledgement information units,
   the transmitting device stores a data block to be sent to the receiving device, in a memory
   the data block is kept stored in the memory if the first type of positive/negative acknowledgment information units is received from the receiving device and indicates that the data block has been received correctly, and
   the data block is removed from the memory if the second type of positive/negative acknowledgment information units is received from the receiving device and indicates that the data block has been received correctly.

9. The method as claimed in claim 8, wherein if the transmitter classifies a positive acknowledgment as unreliable, the data block is resent.

10. The method according to claim 1, wherein
    a first type of positive/negative acknowledgement information units is less reliable than a second type of positive/negative acknowledgement information units, and
    the first type of positive/negative acknowledgement information units is classified as unreliable if it contains a positive acknowledgement for a data block that was previously indicated with a negative acknowledgement as failing.

11. The method according to claim 2, wherein
    a first type of positive/negative acknowledgement information units is less reliable than a second type of positive/negative acknowledgement information units, and
    the first type of positive/negative acknowledgement information units is classified as unreliable if it contains a negative acknowledgement for the data block that was previously indicated with a positive acknowledgement as successful.

12. The method according to claim 2, wherein
    a first type of positive/negative acknowledgement information units is less reliable than a second type of positive/negative acknowledgement information units, and
    the second type of positive/negative acknowledgement information units is transmitted within a Packet Downlink Acknowledgement/Negative Acknowledgement message, a Packet Downlink Acknowledgement/Negative Acknowledgement Type 2 message or a Packet Uplink Acknowledgement/Negative Acknowledgement message.

13. The method according to claim 2, wherein
    a first type of positive/negative acknowledgement information units is less reliable than a second type of positive/negative acknowledgement information units, and
    the first type of positive/negative acknowledgement information units is transmitted within a Piggy-Backed Acknowledgement/Negative Acknowledgement field.

14. The method according to claim 2, wherein
    a first type of positive/negative acknowledgement information units is less reliable than a second type of positive/negative acknowledgement information units, and the transmitting device classifies the first type of positive/negative acknowledgement information units as unreliable if it contains a positive acknowledgement for a data block which has not been transmitted by the transmitting device.

15. The method according to claim 1, wherein a second type of positive/negative acknowledgement is more reliable than a first type of positive/negative acknowledgement.

16. The method according to claim 1, wherein if decoded positive/negative acknowledgement data is incorrect, it is less probable for a second type of positive/negative acknowledgement to pass a consistency check than for a first type of positive/negative acknowledgement.

17. The method according to claim 16, wherein the consistency check is a cyclic redundancy check.

18. The method according to claim 1, wherein the transmitting device uses a Radio Link Control/Medium Access Control protocol for Enhanced General Packet Radio Service using a Fast Acknowledgement/Negative Acknowledgement Reporting feature.

19. A transmitting device for transmitting data blocks to a receiving device, comprising:
a receiver to receive at least first and second different types of positive/negative acknowledgements from the receiving device for data blocks transmitted to the receiving device, the acknowledgements being a packet ACK/NACK and a piggy-backed ACK/NACK;
a classification unit to identify the type of acknowledgement for each positive/negative acknowledgement received; and
a reaction unit to use a first reaction for the first type of positive/negative acknowledgements and to use a second reaction for the second type of positive/negative acknowledgements.

20. The transmitting device according to claim 19, wherein the receiver of the transmitting device receives and processes at least two different types of positive/negative acknowledgement information units, and
each type of positive/negative acknowledgement information unit includes a plurality of acknowledgements of a single type relating to a plurality of individual data blocks.

21. The transmitting device as claimed in claim 19, further comprising:
a memory to store data blocks; and
a controller to:
keep a data block in the memory if a first type of positive/negative acknowledgment is received from the receiving device and indicates that the data block has been received correctly, and
remove a data block from the memory if a second type of positive/negative acknowledgment is received from the receiving device and indicates that the data block has been received correctly.

22. The transmitting device as claimed in claim 19, wherein if the classification unit classifies a positive acknowledgement from the receiving device as unreliable, the data block is resent.

23. The transmitting device as claimed in claim 19, wherein
a first type of positive/negative acknowledgement is less reliable than a second type of positive/negative acknowledgement, and
the second type of positive/negative acknowledgement is transmitted within a Packet Downlink Acknowledgement/Negative Acknowledgement message, a Packet Downlink Acknowledgement/Negative Acknowledgement Type 2 message or a Packet Uplink Acknowledgement/Negative Acknowledgement message.

24. The transmitting device as claimed in claim 19, wherein
a first type of positive/negative acknowledgement is less reliable than a second type of positive/negative acknowledgement, and
the first type of positive/negative acknowledgement is transmitted within a Piggy-Backed Acknowledgement/Negative Acknowledgement field.

25. The transmitting device as claimed in claim 19, wherein
a first type of positive/negative acknowledgement is less reliable than a second type of positive/negative acknowledgement, and
the classification unit classifies the first type of positive/negative acknowledgement as unreliable if it positively acknowledges a data block which is outside of a transmit window.

* * * * *

UNITED STATES PATENT AND TRADEMARK OFFICE
CERTIFICATE OF CORRECTION

PATENT NO. : 8,589,752 B2  
APPLICATION NO. : 12/734451  
DATED : November 19, 2013  
INVENTOR(S) : David Philip Hole et al.

Page 1 of 1

It is certified that error appears in the above-identified patent and that said Letters Patent is hereby corrected as shown below:

On the Title Page  
Item (75), (Inventors), Line 2, Delete "Wilheim," and insert -- Wilhelm, --, therefor.  
Item (56), (Other Publications), Line 1, Delete "celluar" and insert -- cellular --, therefor.

In the Claims  
In Column 14, Line 28, In Claim 10, Delete "claim 1," and insert -- claim 2, --, therefor.

Signed and Sealed this  
Eleventh Day of February, 2014

Michelle K. Lee  
*Deputy Director of the United States Patent and Trademark Office*